(12) United States Patent
Chen et al.

(10) Patent No.: US 11,827,527 B2
(45) Date of Patent: Nov. 28, 2023

(54) BISMUTH RUTHENIUM M-TYPE HEXAFERRITE

(71) Applicant: ROGERS CORPORATION, Chandler, AZ (US)

(72) Inventors: Yajie Chen, Burlington, MA (US); Qifan Li, Hubei (CN)

(73) Assignee: ROGERS CORPORATION, Chandler, AZ (US)

(*) Notice: Subject to any disclaimer, the term of this patent is extended or adjusted under 35 U.S.C. 154(b) by 690 days.

(21) Appl. No.: 17/029,733

(22) Filed: Sep. 23, 2020

(65) Prior Publication Data

US 2021/0179442 A1   Jun. 17, 2021

Related U.S. Application Data

(60) Provisional application No. 62/904,903, filed on Sep. 24, 2019.

(51) Int. Cl.
  *C01G 49/00* (2006.01)
  *H05B 6/72* (2006.01)

(52) U.S. Cl.
  CPC ........... *C01G 49/0036* (2013.01); *H05B 6/72* (2013.01)

(58) Field of Classification Search
  CPC ............. C01G 49/0036; C01G 29/006; C01G 49/0018; C01G 51/40; C01G 55/002; C01G 1/02; H05B 6/72; H03H 2210/026; H03K 17/00; B01D 46/00
  See application file for complete search history.

(56) References Cited

U.S. PATENT DOCUMENTS

| | | | |
|---|---|---|---|
| 3,020,426 A | 2/1962 | Van Der Burgt |
| 3,036,007 A | 5/1962 | Buykx et al. |
| 4,569,775 A | 2/1986 | Kubo et al. |
| 5,110,651 A | 5/1992 | Massard et al. |
| 5,494,749 A | 2/1996 | Kubo et al. |
| 5,591,276 A | 1/1997 | Yoshizawa et al. |
| 5,593,612 A | 1/1997 | Lubitz |
| 5,616,414 A | 4/1997 | Hopstock et al. |
| 6,071,430 A | 6/2000 | Lebourgeois et al. |
| 6,358,432 B1 | 3/2002 | Tomono et al. |
| 6,436,307 B1 | 8/2002 | Lebourgeois et al. |
| 6,736,990 B2 | 5/2004 | Aoki et al. |
| 7,348,374 B2 | 3/2008 | Martinazzo |
| 7,482,977 B2 | 1/2009 | Kuroda et al. |
| 8,305,281 B2 | 11/2012 | Suetsuna et al. |
| 8,758,721 B2 | 6/2014 | Hill |
| 9,596,755 B2 | 3/2017 | Sethumadhavan et al. |
| 10,071,421 B2 | 9/2018 | Suetsuna et al. |
| 10,090,088 B2 | 10/2018 | Suetsuna et al. |
| 2003/0091841 A1 | 5/2003 | Marusawa |
| 2004/0054029 A1 | 3/2004 | Fujiki et al. |
| 2004/0069969 A1 | 4/2004 | Endo et al. |
| 2007/0231614 A1 | 10/2007 | Kondo et al. |
| 2009/0057606 A1 | 3/2009 | Tada et al. |
| 2009/0101873 A1 | 4/2009 | Tan et al. |
| 2009/0266604 A1 | 10/2009 | Tetsuji |
| 2009/0297432 A1 | 12/2009 | Hill |
| 2010/0060539 A1 | 3/2010 | Suetsuna et al. |
| 2010/0068512 A1 | 3/2010 | Imaoka et al. |
| 2011/0147643 A1 | 6/2011 | Ryou et al. |
| 2012/0049100 A1 | 3/2012 | Yonetsu et al. |
| 2012/0068103 A1 | 3/2012 | Hill et al. |
| 2012/0085963 A1 | 4/2012 | An et al. |
| 2012/0229354 A1 | 9/2012 | Ishikura et al. |
| 2013/0115160 A1 | 5/2013 | Hill et al. |
| 2013/0292602 A1 | 11/2013 | Hill |
| 2013/0342414 A1 | 12/2013 | Hong et al. |
| 2014/0264145 A1 | 9/2014 | Ray et al. |
| 2014/0291571 A1 | 10/2014 | Riden |
| 2014/0346387 A1 | 11/2014 | Hill et al. |
| 2015/0310971 A1 | 10/2015 | Kmetz et al. |
| 2016/0086700 A1 | 3/2016 | Suetsuna et al. |
| 2016/0086728 A1 | 3/2016 | Suetsuna et al. |
| 2016/0099498 A1 | 4/2016 | Pance et al. |
| 2016/0113113 A1 | 4/2016 | Sethumadhavan et al. |
| 2016/0118171 A1 | 4/2016 | Hill |
| 2016/0276072 A1 | 9/2016 | Sethumadhavan et al. |
| 2017/0098885 A1 | 4/2017 | Hill et al. |

(Continued)

FOREIGN PATENT DOCUMENTS

| | | |
|---|---|---|
| CN | 101723654 A | 6/2010 |
| CN | 102486655 A | 6/2012 |

(Continued)

OTHER PUBLICATIONS

International Search Report; International Application No. PCT/US2020/051912; International Filing Date: Sep. 22, 2020; dated Jan. 15, 2021; 6 pages.
Sahoo et al. Enahnced Magnetoelectricity in Bismuth Substituted SrFe12O19 Hexaferrite, Aug. 2019, Journal of Applied Physics, vol. 126, No. 7.
Written Opinion; International Application No. PCT/US2020/051912; International Filing Date: Sep. 22, 2020; dated Jan. 15, 2021; 8 pages.
Ismail et al.; "Magnetic Properties of Mechanically Alloyed Cobalt-Zinc Ferrite Nanoparticles"; J. Supercond Nov Magn; 27; pp. 1293-1298; (2014).
Brando et al., "Microwave Electromagnetic Characteristics of New Substituted M-Hexaferrites BaFe12—2xAxMexO19 (A=Ru, Ir ; Me=Co, Zn)", Journal De Physique IV France, Mar. 1997.
Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.

(Continued)

*Primary Examiner* — Timothy C Vanoy
(74) *Attorney, Agent, or Firm* — CANTOR COLBURN LLP

(57) ABSTRACT

In an aspect, a ferrite composition comprises a BiRuCo-M-type ferrite having the formula $Me_{1-x}Bi_xCo_yRu_zFe_{12-t}O_{19}$, wherein Me is at least one of Sr, Pb, or Ba; x is 0.01 to 0.5; y is 0.1 to 2; z is 0 to 4, and t is 0 to 4; wherein the Co can be at least partially replaced by at least one of Zn, Cu, or Mg by an amount of less than y, and the Ru can be at least partially replaced by at least one of Ti, Sn, or Zr, where the substitution amount is not more than z or is less than z.

20 Claims, 1 Drawing Sheet

(56) References Cited

U.S. PATENT DOCUMENTS

| | | |
|---|---|---|
| 2017/0213628 A1 | 7/2017 | Chen et al. |
| 2018/0016157 A1 | 1/2018 | Chen et al. |
| 2019/0013128 A1 | 1/2019 | Chen et al. |
| 2019/0040226 A1 | 2/2019 | Aga et al. |
| 2019/0264005 A1 | 8/2019 | Horn et al. |
| 2019/0318858 A1 | 10/2019 | Chen et al. |
| 2021/0032121 A1 | 2/2021 | Li et al. |
| 2021/0043346 A1 | 2/2021 | Li et al. |
| 2021/0065943 A1 | 3/2021 | Zhang et al. |
| 2021/0225566 A1 | 7/2021 | Zhang et al. |
| 2021/0261433 A1 | 8/2021 | Chen et al. |

FOREIGN PATENT DOCUMENTS

| | | | |
|---|---|---|---|
| CN | 103304186 A | 9/2013 | |
| CN | 104193224 A | 12/2014 | |
| DE | 3907220 | 9/1990 | |
| EP | 0620571 A2 | 10/1994 | |
| EP | 0884740 A1 | 12/1998 | |
| EP | 0905718 A1 | 3/1999 | |
| EP | 1541641 A1 | 6/2005 | |
| EP | 1652829 A2 | 5/2006 | |
| EP | 1819211 A1 | 8/2007 | |
| EP | 2784044 A1 | 10/2014 | |
| GB | 1105788 A | 3/1968 | |
| JP | 62216922 A | 9/1987 | |
| JP | H01200605 A | 8/1989 | |
| JP | H09167703 | 6/1997 | |
| JP | H09213513 A | 8/1997 | |
| JP | H09232123 A | 9/1997 | |
| JP | 2000235916 A | 8/2000 | |
| JP | 2000277973 | 10/2000 | |
| JP | 2000277973 A | 10/2000 | |
| JP | 2001085210 A | 3/2001 | |
| JP | 2009155545 A | 7/2009 | |
| TW | M417764 | 12/2011 | |
| WO | 2012103020 A2 | 8/2012 | |
| WO | 2016064459 | 4/2016 | |
| WO | 2016123598 A1 | 8/2016 | |
| WO | 2017068444 | 4/2017 | |
| WO | 2018043943 A1 | 3/2018 | |
| WO | WO 2021/061599 A1 * | 4/2021 | ............... H01F 1/34 |

OTHER PUBLICATIONS

Lee et al. "Role of Small Permeability in Gigahertz Ferrite Antenna Performance," IEEE Magnetics Letter, 2013, vol. 4.

Li et al. "High-frequency magnetic properties of W-type barium-ferrite BaZn2—xCoxFe16O27 composites", Journal of Applied Physics 94, 5918 (2003): https://doi.org/10.1063/1.1618945.

Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.

Martin et al.; "Flexible Magnetic Composites"; Passive RF Component Technoloby, Materials Techniques and Applications; Chapter 8; 2012; pp. 156-185.

Park et al. "Design of Wide bandwidth microwave absorber with Ferrite composites of broad magenetic loss specturm," Advanced Materials Engineering, 2015.

Singh et al. "Static Magentic Properties of Co and Ru substituted Ba—Sr ferrite," 2008, Materials Research Bulletin, pp. 176-184, vol. 43.

Allia et al.; "Fe3O4 nanoparticles and nanocomposites and potential application in biomedicine and in communication technologies: Nanoparticle aggregation, interaction, and effective magnetic anisotropy"; J. of Applied Physics 116; 113903 (2014) 10 pgs.

Bid et al.; "Microstructure Characterization of Mechanosynthesized Nanocrystalling NiFe2O4 by Rietveld's Analysis"; Physica E 39; pp. 175-184; (2007).

Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.

Chicinas, I.; "Soft Magnetic Nanocrystalline Powders Produced by Mechanical Alloying Routes"; Journal of Optoelectronics and Advanced Materials; 8(2); pp. 439-448; (2006).

Cruz-Montoya et al., "Synthesis and characterization of polymer nanocomposites containing magnetic nanoparticles"; Journal of Applied Physics 107; 09B506 (2010); 4 pgs.

Dedi et al., "Magnetic properties of cobalt ferrite synthesized by mechanical alloying", AIP Conference Proceedings, 1964; 020003 2018; 5 pages.

Deng, et al; Effect of Bi and Mo Doping on Magnetic and Sintered Characteristics of MgCuZn Ferrite, Journal of Inorganic Materials, 2008, pp. 670-672, vol. 23 No. 4.

EP Supplemental Search Report; EP Application No. 15853114; dated Nov. 21, 2017; 8 pages.

Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.

Han et al.; "Microwave-absorption properties of Fe(Mn)/ferrite nanocapsules"; J. Phys. D: Appl. Phys. 42; (2009) 5 pages.

Hansen et al., "Antennas with Magneto-Dielectrics", Microwave and Optical Technology Letters, vol. 26, No. 2, Jul. 2000, pp. 75-78.

Huang et al; "Magnetic epoxy nanocomposites with superparamegnetic MnFe2O4 nanoparticles"; AIP Advance 5; 097183 (2015); 16 pgs.

Jaejin Lee et al: "Role of Small Permeability in Gigahertz Ferrite Antenna Performance", IEEE Magnetics Letters, col. 2, Jan. 1, 2013, pp. 5000104-5000104, XP055241013, USA.

Koch, C. C.; "Materials Synthesis by Mechanical Alloying"; Annu. Rev. MaterSci. 19; pp. 121-143; (1989).

Koch, C.C .; "Intermetallic Matrix Composites Prepared by Mechanical Alloying—a Review"; Materials Science and Engineering; A244; pp. 39-48; (1998).

Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.

Li et al.; "Microstructure effects on shock-induced surface jetting"; Journal of Applied Physics 115; 073504 (2014); pp. 11.

Liu et al.; "Corrigendum: Electromagnetic-wave-absorption properties of wire-like structures self-assembled by FeCo nanocapsules"; J. Phys. D: Appl. Phys. 45; (2012); 7 pages.

Mou, Fangzhi et al., "Oriented Contraction: A Facile Nonequilibrium Heat-Treatment Approach for Fabrication of Maghemite Fiber-in-Tube and Tube-in-Tube Nanostructures", Langmuir 2010, 26 (19), pp. 15580-15585.

Mu et al., "Improvement of high-frequency characteristics of Z-type hexaferrite by dysprosium doping", Journal of Applied Physics, 109, 123925, 2011, 6 pages.

Narayanasamy et al., "Influence of Mechanical Milling and Thermal Annealing on Electrical and Magnetic Properties of Nanstructured Ni—Zn and Coblat Ferrites," June 2208, Bull Mater Sci., vol. 31 No. 3, pp. 373-380.

Ohnuma et al., "Soft Magnetic Properties of FeN/FeBN Multi-layers," Journal on Magnetics, Nov. 1992, pp. 896-901, vol. 7 No. 11.

Ohnuma et al.,"Soft Magnetic Multilayers for Micromagnetic Devices,"Journal of Magnetism and Magnetic Materials, 1993, pp. 556-562, vol. 126.

Pal et al.; "Synthesis and magnetic properties of gold coated iron oxide nanoparticles"; Journal of Applied Physics 105; 07B504 (2009); 4 pgs.

Pasko et al. "Magnetic and Structural characterization of nanosized BaCoxZn2—xFe16O27 hexaferrite in the vicinity of spin reorientation transition," 2011, Journal of Physics: Conference Series 303.

Pullar, "Hexagonal Ferrites: A Review of the synthesis, properties and application of hexaferrite ceramics," Mar. 2012, Progress in Material Science, vol. 57, No. 7, pp. 1191-1334.

Sahu et al.; "Influence of excess Fe accumulation over the surface of FePt nanoparticles: Structural and magnetic properties"; Journal of Applied Physics 113; 134303 (2013); 1 pg Abstract only.

Sepelak et al.; "Nanocrystalline Nickel Ferrite, NiFe2O4: Mechanosynthesis, Nonequilibrium Cation Distribution, Canted Spin Arrangement, and Magnetic Behavior"; J.Phys.Chem. C; 111; pp. 5026-5033; (2007).

(56) References Cited

OTHER PUBLICATIONS

Sepelak et al.; "Structural and Magnetic Properties of Nanosize Mechanosynthesized Nickel Ferrite"; Jounral of Magnetism and Magnetic Materials; 272-276; pp. 1616-1618; (2004).

Sharma et al.; "Ultra Low Loss Soft Magnetic Nanoparticles for Applications up to S-band," Applied Physics Letters, vol. 103, 112402, Sep. 2013.

Su et el., "Low Loss Factor Co2Z Ferrite Composites with Equivalent Permittivity and Permeability for Ultra-high Frequency Applications," Applied Physics Letters, Aug. 2014, vol. 105 No. 062402.

Thakur et al, "Low-loss Spinel Nanoferrite with Matching Permeability and Permittivity in the Ultrahigh Frequency Range," Journal of Applied Physics—Jul. 2010, vol. 108.

Thanh Ba Do; "High Temperature Composite Materials and Magnetodielectric Composites for Microwave Application"; Dissertation; University of Michigan; 2010; 223 pages.

Waje et al.; "Sintering Temperature dependence of Room Temperature Magnetic and Dielectric Properties of Co0.5Zn0.5F32O4 Prepared using Mechanically Alloyed Nanoparticles"; Journal of magnetism and Magnetic Materials, 322; pp. 686-691; (2010).

Wu et al.; "Studies of high-frequency magnetic permeability of rod-shaped CrO2 nanoparticles"; Phys. Stat. Sol. (a) 204; No. 3; pp. 755-762; 2007.

Xu et al., "Structural, dielectric and magnetic properties of Nd-doped Co2Z-type hexaferrites", Jounal of Alloys and Compounds, 509, 2011, pp. 4290-4294.

Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.

Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.

Zaher et al.; "Osmotically driven drug delivery through remote-controlled magnetic nanocomposite membranes"; Biomicrofluidics 9; 054113 (2015); 17 pgs.

Aoyama et al.; "Preparation and Characterization of Z-type Hexaferrites, Ba3(1-x)Sr3xCo2Fe24O41 with x=0-0.5, via a two-step calcination with an intermediate wet milling"; J. Electroceram; 17; pp. 61-64 (2006).

Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.

Cao et al. "Hydrogen-Induced Lateral Growth of Nickel Coating on Ba3Co2Fe24O4 ♪ (Co2Z-Based Hexaferrite during the Electroplating of Multilayer Chip Inductors," Journal of the Electrochemical Society, 2002, vol. 149 Issue 12, pp. J89-J92.

Haijun et al., "The preparation and microwave properties of Ba3ZnzCo2—zFe24O41 ferrite by citrate sol-gel process", Materials Science and Engineering, B84, 2001, pp. 252-257.

Kim et al., "Effects of in3+ site occupancy on the magnetic properties of M-type strontium hexaferrites", AIB Advances 10, 015040 (2020); https://doi.org/10.1063/1.5130073; 5 pages.

Kristiantoro et al. , "Magnetic properties of cobalt ferrite synthesized by mechanical alloying", from AIP Conf 1964, 020003 (2018) Published Online May 15, 2018; 5 pages.

Lee et al., "Low Loss Co2Z (Ba3Co2Fe24O41)-Glass Composite for Gigahertz Antenna Application," Journal of Applies Physics, 2011, vol. 109, 07E530-2.

Li et al; "Static and Dynamic Magnetic Properties of Co2Z Barium Ferrite Nanoparticle Composites"; Journal of Materials Science, 40, pp. 719-723 (2005).

Mattei et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.

Morch et al. "Structure and Magnetic properties of W-type hexaferrites," 2019, IUCRJ, pp. 492-499, vol. 6.

Pullar, "Magnetic Properties of Aligned Co2Z Hexagonal Z-Ferrite Fibers," International Journal of Applied Ceramic Technology, 2014, pp. 451-456, vol. 11, No. 3.

Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.

Zhen et al.; "Microwave absorption properties of FeNi3 submicrometre spheres and SiO2@FeNi3 core-shell structures"; J. Phys. D: Appl. Phys. 43; (2010); 7 pages.

\* cited by examiner

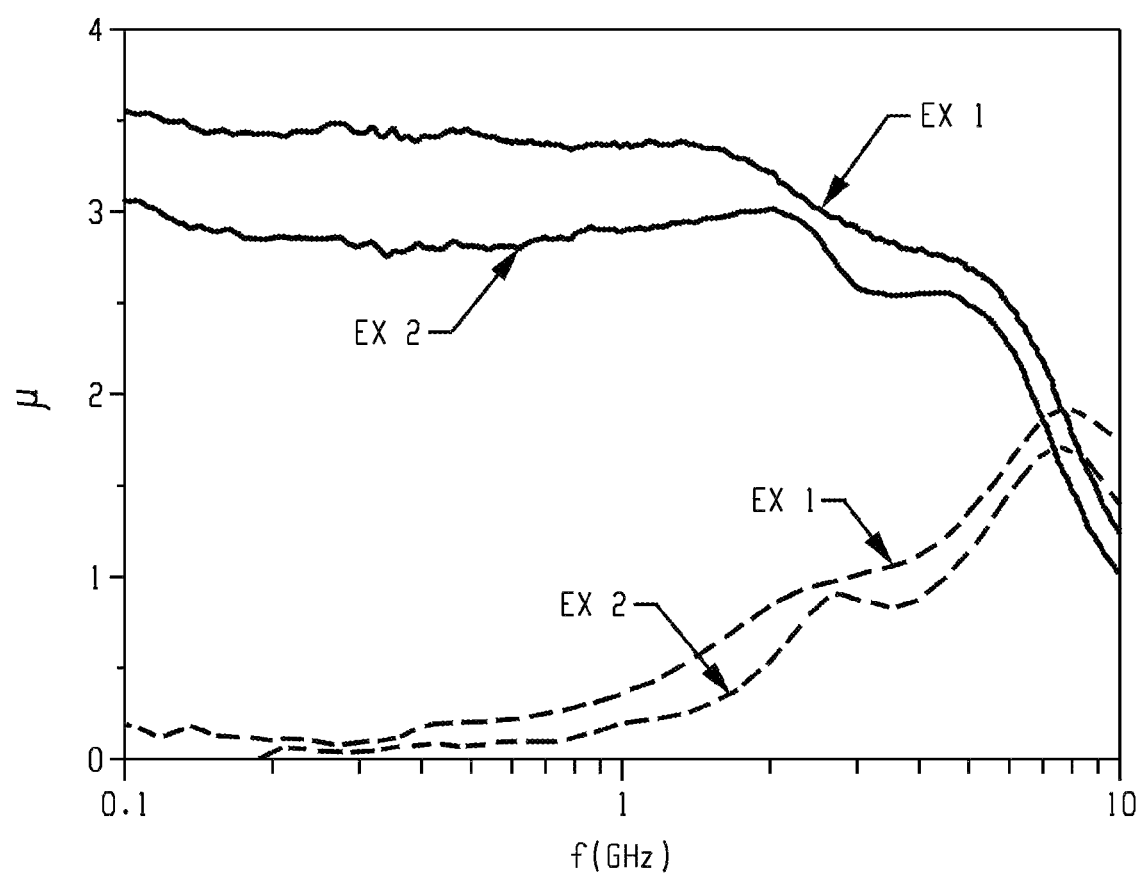

BISMUTH RUTHENIUM M-TYPE HEXAFERRITE

CROSS-REFERENCE TO RELATED APPLICATION

This application claims the benefit of U.S. Provisional Patent Application Ser. No. 62/904,903 filed Sep. 24, 2019. The related application is incorporated herein in its entirety by reference.

BACKGROUND

Improved performance and miniaturization are needed to meet the ever-increasing demands of devices used in ultra-high frequency (UHF), L-band, and S-band applications, which are of particular interest in a variety of commercial and defense related industries. As an important component in radar and modern wireless communication systems, antenna elements with compact size are constantly being developed. It has been challenging, however, to develop ferrite materials for use in such high frequency applications as most ferrite materials exhibit relatively high magnetic loss at high frequencies. In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites $((Ba,Sr)Fe_{12}O_{19})$, W-type ferrites $((Ba,Sr)Me_2Fe_{16}O_{27})$, X-type ferrites $((Ba,Sr)_2Me_2Fe_{28}O_{46})$, and U-type ferrites $((Ba,Sr)_4Me_2Fe_{36}O_{60})$.

Despite these improvements in ferrite composites, their use in high frequency and microwave devices is limited as these substitutions also result in an increase in the magnetic loss. Improved ferrite compositions are therefore desired.

BRIEF SUMMARY

Disclosed herein is a BiRuCo-M-type phase ferrite.

In an aspect, a ferrite composition comprises a BiRuCo-M-type ferrite having the formula $Me_{1-x}Bi_xCo_yRu_zFe_{12-t}O_{19}$, wherein Me is at least one of Sr, Pb, or Ba; x is 0.01 to 0.5; y is 0.1 to 2; z is 0 to 4, and t is 0 to 4; wherein the Co can be at least partially replaced by at least one of Zn, Cu, or Mg by an amount of less than y, and the Ru can be at least partially replaced by at least one of Ti, Sn, or Zr, where the substitution amount is not more than z or is less than z.

In another aspect, an article comprises at least one of the ferrite composition or a ferrite composite comprising the ferrite composition.

In yet another aspect, a method of making the ferrite composition comprises mixing ferrite precursor compounds comprising Me, Fe, Bi, Co, and Ru; and sintering the ferrite precursor compounds in an oxygen atmosphere to form the BiRuCo-M-type ferrite.

The above described and other features are exemplified by the following FIGURE, detailed description, and claims.

BRIEF DESCRIPTION OF THE DRAWING

The following FIGURE is an exemplary embodiment that is provided to illustrate the present disclosure. The FIGURE is illustrative of the example, which is not intended to limit devices made in accordance with the disclosure to the materials, conditions, or process parameters set forth herein.

FIG. 1 is a graphical illustration of the permeability and magnetic loss tangent with frequency for Example 1 and Example 2.

DETAILED DESCRIPTION

It was discovered that substituting at least a portion of the metal ion in an M-type hexaferrite with ruthenium and bismuth could result in a BiRuCo-M-type ferrite with improved properties. Specifically, the BiRuCo-M-type ferrite that can have the general formula:

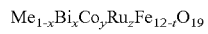

$$Me_{1-x}Bi_xCo_yRu_zFe_{12-t}O_{19}$$

wherein Me is at least one of Sr, Pb, or Ba; x is 0.01 to 0.5; y is 0.1 to 2; z is 0 to 4, t is 0 to 4, the Co can be at least partially replaced by at least one of Zn, Cu, or Mg by an amount of less than y, and the Ru can be at least partially replaced by at least one of Ti, Sn, or Zr, where the substitution amount is not more than z or is less than z. Me can be at least Ba.

The BiRuCo-M-type ferrite can have a planar easy magnetization (c-plane). The BiRuCo-M-type ferrite can have at least one of a high permeability, high operating frequency, or a low magnetic loss, making it suitable for use as an antenna or an inductor at S-L band frequency. The BiRuCo-M-type ferrite can have a permeability of greater than or equal to 2.5, or greater than or equal to 3, or 2.5 to 4 at a frequency of 1 to 2 gigahertz, or at 1 to 4 gigahertz in the form of a solid ceramic. The BiRuCo-M-type ferrite can have a magnetic loss tangent tan $\delta_\mu$ of less than or equal to 0.2, less than or equal to 0.5, or less than or equal to 0.05, or 0.01 to 0.4 at a frequency of 1 to 2 gigahertz in the form of a solid ceramic. The BiRuCo-M-type ferrite can have a permittivity of 8 to 12, or 6 to 11 at a frequency of 1 to 2 gigahertz in the form of a solid ceramic. The BiRuCo-M-type ferrite can have a dielectric loss tangent tank of less than or equal to 0.02, less than or equal to 0.008, or 0.001 to 0.2 at a frequency of 1 to 2 gigahertz in the form of a solid ceramic. The BiRuCo-M-type ferrite can have an operating frequency of 0.1 to 4 gigahertz, or 0.5 to 2 gigahertz, or 1 to 2 gigahertz, in the form of a solid ceramic.

The BiRuCo-M-type ferrite can have at least one of a low dielectric loss tangent tank or a magnetic loss tangent tan N within the ultrahigh frequency range. For example, the BiRuCo-M-type ferrite can have at least one of a dielectric loss tangent tank of less than or equal to 0.01, or less than or equal to 0.008, or 0.006 to 0.01 or a magnetic loss tangent tan N of less than or equal to 0.12, or less than or equal to 0.08, or 0.05 to 0.12 at a frequency of 1 to 2 gigahertz, in the form of a solid ceramic.

As used herein, magnetic and dielectric properties are measured in coaxial airline by vector network analyzer (VNA) using the Nicholson-Ross-Weir (NRW) method and the permeability and permittivity values are the relative permeability and the relative permittivity, respectively.

The BiRuCo-M-type ferrite can be prepared using any suitable method. Generally, the BiRuCo-M-type ferrite can be formed by first forming a mixture comprising the precursor compounds including oxides of at least Me, Bi, Co, Ru, and Fe. For example, the mixture can comprise at least $MeCO_3$, $Bi_2O_3$, $Co_3O_4$, $RuO_2$, and $Fe_2O_3$. The mixture can comprise 5 to 20 weight percent of $MeCO_3$ based on the total weight of the precursor compounds. The mixture can comprise 0.01 to 20 weight percent, or 5 to 20 weight percent of $Bi_2O_3$ based on the total weight of the precursor compounds.

The mixture can comprise 1 to 15 weight percent of $Co_3O_4$ based on the total weight of the precursor compounds. The mixture can comprise 0.1 to 10 weight percent of $RuO_2$ based on the total weight of the precursor compounds. The mixture can comprise 50 to 80 weight percent of $Fe_2O_3$ based on the total weight of the precursor compounds. The mixture can further comprise an oxide of at least one of Zn, Mg, Ti, Zr, Sn, or Cu.

The mixture can be calcined in air to form a calcined ferrite comprising an M-type ferrite. The calcining can occur at a calcination temperature of 800 to 1,300 degrees Celsius (° C.). The calcining can occur for a calcination time of 0.5 to 20 hours, 1 to 10 hours, or 2 to 5 hours. It is noted that the calcination step is optional, and the only heating step can be the sintering.

The calcined ferrite can be crushed and optionally sieved to form particulates. The sieving can comprise sieving through a number 10 to 100 mesh screen. Coarse particles can be further ground to reduce the particle size. The particulates can have a median D50 particle size by volume of 0.5 to 50 micrometers, or 0.5 to 10 micrometers. The particle size can be determined using Horiba LA-910 laser light scattering PSD analyzer or as determined in accordance with ASTM D4464-15. The calcined ferrite can be mixed with a binder. The binder can comprise at least one of poly(vinyl alcohol), poly(vinyl butyral), methyl cellulose, poly(ethylene glycol), or poly(alkylene carbonate). The binder can be present in an amount of 8 to 12 weight percent based on the total amount of the calcined ferrite plus the binder. The binder can facilitate shaping of the calcined ferrite and can fully burn off during sintering. The bound calcined ferrite can have a median D50 particle size by volume of 10 to 300 micrometers, or 50 to 300 micrometers.

The calcined ferrite can be optionally shaped and sintered to form the BiRuCo-M-type ferrite. The method of shaping is not limited and can comprise at least one of uniaxial compression, isostatic pressing, casting, pressing, or the like. The pressing can occur at a pressure of 0.5 to 2 metric tons per centimeter squared. The sintering can occur at a sintering temperature of 1,000 to 1,300° C., or 1,200 to 1,250° C. The ramping temperature up to and down from the sintering temperature can each independently occur at a ramp rate of 1 to 5° C. per minute. The sintering can occur for a sintering time of 1 to 20 hours, or 5 to 12 hours. The sintering can be performed in an oxygen environment to help reduce the dielectric loss. Oxygen can be introduced to the sintering chamber at a flow rate of 0.1 to 10 liters per minute. The sintered BiRuCo-M-type ferrite can be finished in any desired manner, for example, by cutting or polishing, depending on the application.

Prior to the sintering, an additional amount of bismuth oxide can be added to the calcined ferrite. The bismuth oxide can be added in an amount of 0.01 to 5 weight percent based on the total weight of the calcined ferrite. $Bi_2O_3$ can be added into a starting mixture or to the calcined ferrite powder, depending upon the desired distribution of Bi ions. Bi ions can be located in the crystalline lattice or can be at the grain boundaries. The addition of an additional amount of $Bi_2O_3$, which can be present at grain boundaries of the M-type ferrite phase, can aid in achieving a composition that has equal or substantially equal values of permeability and permittivity while retaining low magnetic and dielectric loss tangents.

The BiRuCo-M-type ferrite can have an average grain size of 1 to 100 micrometers, or 5 to 50 micrometers.

The BiRuCo-M-type ferrite can be a bulk ceramic or can be present in a composite, for example, comprising the BiRuCo-M-type ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N- or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters or polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The BiRuCo-M-type ferrite can be mixed with a polymer to form the composite. The mixing can comprise mixing at a temperature of a melting point of the polymer. The mixing can comprise mixing a polymer precursor with the BiRuCo$_2$M ferrite and reacting the polymer precursor to form the polymer. Methods of forming the composite are not limited and can comprise injection molding, reaction injection molding, laminating, extruding, compression molding, calendering, casting, and the like. The composite can be free of a void space.

The BiRuCo-M-type ferrite can be surface-treated (also referred to herein as coated) to aid dispersion into the polymer or polymer precursor, for example, with at least one of a surfactant (such as oleylamine oleic acid), an inorganic material (such as $SiO_2$, $Al_2O_3$, or MgO), a silane, a titanate, or a zirconate.

The coating can comprise at least one of a silane coating, a titanate coating, or a zirconate coating. The coating can comprise at least one of phenyltrimethoxysilane, p-chloromethylphenyltrimethoxy silane, aminoethylaminotrimethoxy silane, aminoethylaminopropyltrimethoxy silane, phenyltriethoxysilane, 3,3,3-trifluoropropyl trimethoxysilane, (tridecafluoro-1,1,2,2-tetrahydrodecyl)-1-triethoxysilane, neopentyl(diallyl)oxytrineodecanoyl titanate, neopentyl(diallyl) oxytri(dioctyl)phosphate titanate, neopentyl(diallyl)oxytri (dioctyl)pyrophosphate zirconate, or neopentyl(diallyl) oxytri(N-ethylenediamino)ethyl zirconate. The coating can comprise a silane coating comprising at least one of an aromatic silane such as phenyltrimethoxysilane or a fluorinated aliphatic alkoxy silane such as (tridecafluoro-1,1,2,2-tetrahydrooctyl)triethoxy silane.

An article can comprise the BiRuCo-M-type ferrite. The article can be an antenna or an inductor core. The article can be for use in the frequency range of 0.1 to 4 gigahertz, or 0.5 to 2 gigahertz. The article can be used for a variety of devices operable within the ultrahigh frequency range, such as a high frequency or microwave antenna, filter, inductor, circulator, or phase shifter. The article can be operable at frequencies greater than or equal to 0.1 GHz, or at frequencies greater than or equal to 0.3 GHz. Such articles can be used in commercial and military applications, weather radar, scientific communications, wireless communications, autonomous vehicles, aircraft communications, space communications, satellite communications, or surveillance.

A ferrite composition comprising a BiRuCo-M-type ferrite can have the formula $Me_{1-x}Bi_xCo_yRu_zFe_{12-t}O_{19}$. Me can comprise at least one of Sr, Pb, or Ba. Me can comprise at least Ba. x can be 0.01 to 0.5, or 0.01 to 0.5. y can be 0.1 to 2, or 1 to 2. z can be 0 to 4. t can be 0 to 4. The Co can be at least partially replaced by at least one of Zn, Cu, or Mg by an amount of less than y. The Ru can be at least partially replaced by at least one of Ti, Sn, or Zr, where the substitution amount is not more than z or is less than z. The BiRuCo-M-type ferrite can have the formula $Ba_{1-x}Bi_xCo_yRu_zFe_{12-t}O_{19}$.

The ferrite composition can have a permeability of greater than or equal to 2.5, or greater than or equal to 3, or 2.5 to 4 at a frequency of 1 to 2 gigahertz in the form of a solid ceramic. The ferrite composition can have a permittivity of 8 to 12, or 6 to 11 at a frequency of 1 to 2 gigahertz in the form of a solid ceramic. The ferrite composition can have a magnetic loss tangent tan $\delta_\mu$ of less than or equal to 0.2, less than or equal to 0.5, or less than or equal to 0.05, or 0.01 to 0.4 at a frequency of 1 to 2 gigahertz in the form of a solid ceramic. The ferrite composition can have a dielectric loss tangent tank of less than or equal to 0.02, less than or equal to 0.008, or 0.001 to 0.2 at a frequency of 1 to 2 gigahertz in the form of a solid ceramic. A composite can comprise the ferrite composition and a polymer. An article can comprise the ferrite composition. An article can comprise the ferrite composite. The article can be an antenna, filter, inductor, circulator, or phase shifter. The article can be a microwave antenna. The antenna can be operable at a frequency of greater than or equal to 0.1 gigahertz, or greater than or equal to 0.3 gigahertz, or 0.1 to 4 gigahertz.

A method of making a ferrite composition can comprise mixing ferrite precursor compounds comprising Me, Fe, Bi, Co, and Ru; and sintering the ferrite precursor compounds in an oxygen atmosphere to form the BiRuCo-M-type ferrite. The ferrite precursor compounds can comprise $MeCO_3$, $Bi_2O_3$, $Co_3O_4$, $RuO_2$, and $Fe_2O_3$. The ferrite precursor compounds can comprise 5 to 20 weight percent of $MeCO_3$, 0.01 to 20 weight percent of $Bi_2O_3$, 1 to 15 weight percent of $Co_3O_4$, 0.1 to 10 weight percent of $RuO_2$, and 50 to 80 weight percent of $Fe_2O_3$; all based on the total weight of the precursor compounds. The sintering can occur at a sintering temperature of 1,000 to 1,300° C., or 1,200 to 1,250° C. for a sintering time of 1 to 20 hours, or 5 to 12 hours. The method can further comprise calcining the ferrite precursor compounds in air prior to the sintering. The method can further comprise mixing the ferrite precursor compounds with a binder prior to the sintering. The method can further comprise forming the ferrite precursor compounds prior to the sintering.

The following examples are provided to illustrate the present disclosure. The examples are merely illustrative and are not intended to limit devices made in accordance with the disclosure to the materials, conditions, or process parameters set forth therein.

EXAMPLES

In the examples, the magnetic permeability of the resulting ferrite samples was measured in coaxial airline by vector network analyzer (VNA) using the Nicholson-Ross-Weir (NRW) method over a frequency of 0.1 to 10 GHz.

The particle sizes were determined using Horiba LA-910 laser light scattering PSD analyzer or as determined in accordance with ASTM D4464-15. The reported particle size is the median D50 particle size by volume.

Examples 1 and 2: Effect of Bismuth on the BiRuCo-M-Type Phase Ferrite

Two samples of the RuCo-M-type phase ferrite with and without bismuth were formed by mixing appropriate amounts of $BaCO_3$, $Bi_2O_3$, $Co_3O_4$, $RuO_2$, and $Fe_2O_3$ in a wet planetary mill to form a mixture. The mixtures were calcined to a calcination temperature of 1,200° C. for a soak time of 4 hours in air. The calcined ferrite was crushed and sieved through a 40 mesh screen. The coarse particles were ground to form particulates having a median D50 particle size by volume of 0.5 to 10 micrometers in a wet planetary mill. A granulate mixture was formed by mixing the particulates with 0.5 to 5 weight percent of poly(vinyl alcohol) based the total amount of the granulate mixture. The granulate mixture was then compressed to form toroid granules having an outer diameter of 7 millimeters, an inner diameter of 3 millimeters, and a thickness of 3 to 3.5 millimeters at a pressure of 1 metric tons per centimeter squared. The toroid granules were sintered at a sintering temperature of 1,200° C. for 10 hours in atmosphere of oxygen by flowing oxygen gas at a rate of 0.5 liters per minute, using a ramp rate: 3° C. per minute and a cooling rate of −3° C. per minute. The RuCo-M-type phase ferrites with and without bismuth had formulae $BaCo_{1.2}Ru_{0.2}Fe_{10.93}O_{19}$ and $Ba_{0.95}Bi_{0.05}Co_{1.2}Ru_{0.2}Fe_{10.93}O_{19}$, respectively.

The permeability (solid lines) and the magnetic loss tangent (dashed lines) are shown in FIG. 1 as a function of frequency and specific values of the different compositions are shown in Table 1.

TABLE 1

| Ferrite Sample | 1 | 2 |
|---|---|---|
| Bismuth | N | Y |
| $\mu'$ at 1 GHz | 3.37 | 2.90 |
| $\mu'$ at 1.6 GHz | 3.31 | 2.98 |
| $\mu'$ at 2 GHz | 3.21 | 3.02 |
| $\tan\delta_\mu$ at 1 GHz | 0.10 | 0.05 |
| $\tan\delta_\mu$ at 1.6 GHz | 0.20 | 0.09 |
| $\tan\delta_\mu$ at 2 GHz | 0.25 | 0.16 |
| $\varepsilon'$ at 1 GHz | 11.3 | 10.9 |
| $\varepsilon'$ at 1.6 GHz | 11.2 | 10.8 |
| $\varepsilon'$ at 2 GHz | 11.3 | 10.8 |
| $\tan\delta_\varepsilon$ at 1 GHz | 0.052 | 0.017 |
| $\tan\delta_\varepsilon$ at 1.6 GHz | 0.040 | 0.013 |
| $\tan\delta_\varepsilon$ at 2 GHz | 0.040 | 0.015 |

The results show that incorporating an amount of bismuth in the ruthenium ferrite, results in a significant decrease in the magnetic loss tangent, while still maintaining a permeability, $\mu'$, of greater than or equal to 2.5 from 1 to 2 gigahertz.

Set forth below are non-limiting aspects of the present disclosure.

Aspect 1: A ferrite composition comprising a BiRuCo-M-type ferrite having the formula $Me_{1-x}Bi_xCo_yRu_zFe_{12-t}O_{19}$, wherein Me is at least one of Sr, Pb, or Ba; x is 0.01 to 0.5; y is 0.1 to 2; z is 0 to 4, and t is 0 to 4; wherein the Co can be at least partially replaced by at least one of Zn, Cu, or Mg by an amount of less than y, and the Ru can be at least partially replaced by at least one of Ti, Sn, or Zr, where the substitution amount is not more than z or is less than z.

Aspect 2: The ferrite composition of aspect 1, wherein y is 1 to 2.

Aspect 3: The ferrite composition of any one or more of the preceding aspects, wherein Me is at least Ba.

Aspect 4: The ferrite composition of any one or more of the preceding aspects, wherein x is 0.01 to 0.5.

Aspect 5: The ferrite composition of any one or more of the preceding aspects, wherein the ferrite composition has a permeability of greater than or equal to 2.5, or greater than or equal to 3, or 2.5 to 4 at a frequency of 1 to 2 gigahertz in the form of a solid ceramic.

Aspect 6: The ferrite composition of any one or more of the preceding aspects, wherein the ferrite composition has a permittivity of 8 to 12, or 6 to 11 at a frequency of 1 to 2 gigahertz in the form of a solid ceramic.

Aspect 7: The ferrite composition of any one or more of the preceding aspects, wherein the ferrite composition has a magnetic loss tangent tan N of less than or equal to 0.2, less than or equal to 0.5, or less than or equal to 0.05, or 0.01 to 0.4 at a frequency of 1 to 2 gigahertz in the form of a solid ceramic.

Aspect 8: The ferrite composition of any one or more of the preceding aspects, wherein the ferrite composition has a dielectric loss tangent tank of less than or equal to 0.02, less than or equal to 0.008, or 0.001 to 0.2 at a frequency of 1 to 2 gigahertz in the form of a solid ceramic.

Aspect 9: A composite comprising the ferrite composition of any one or more of the preceding aspects and a polymer.

Aspect 10: An article comprising the ferrite composition of any one or more of Aspects 1 to 9 or the composite of Aspect 9.

Aspect 11: The article of aspect 10, wherein the article is an antenna, filter, inductor, circulator, or phase shifter.

Aspect 12: The article of any one or more of Aspects 10 to 11, wherein the article is a microwave antenna.

Aspect 13: The article of any one or more of Aspects 10 to 12, wherein the article is an antenna operable at a frequency of greater than or equal to 0.1 gigahertz, or greater than or equal to 0.3 gigahertz, or 0.1 to 4 gigahertz.

Aspect 14: A method of making a ferrite composition, for example, of any one or more of the preceding aspects comprising: mixing ferrite precursor compounds comprising Me, Fe, Bi, Co, and Ru; and sintering the ferrite precursor compounds in an oxygen atmosphere to form the BiRuCo-M-type ferrite.

Aspect 15: The method of Aspect 14, wherein the ferrite precursor compounds comprise $MeCO_3$, $Bi_2O_3$, $Co_3O_4$, $RuO_2$, and $Fe_2O_3$.

Aspect 16: The method of Aspect 15, wherein the ferrite precursor compounds comprise 5 to 20 weight percent of $MeCO_3$, 0.01 to 20 weight percent of $Bi_2O_3$, 1 to 15 weight percent of $Co_3O_4$, 0.1 to 10 weight percent of $RuO_2$, and 50 to 80 weight percent of $Fe_2O_3$; all based on the total weight of the precursor compounds.

Aspect 17: The method of any one or more of Aspects 14 to 16, wherein the sintering occurs at a sintering temperature of 1,000 to 1,300° C., or 1,200 to 1,250° C. for a sintering time of 1 to 20 hours, or 5 to 12 hours.

Aspect 18: The method of any one or more of Aspects 14 to 17, further comprising calcining the ferrite precursor compounds in air prior to the sintering.

Aspect 19: The method of any one or more of Aspects 14 to 18, further comprising mixing the ferrite precursor compounds with a binder prior to the sintering.

Aspect 20: The method of any one or more of Aspects 14 to 19, further comprising forming the ferrite precursor compounds prior to the sintering.

Aspect 21: The ferrite composition or method of any one or more of the preceding aspects, wherein the Co is at least partially replaced by Zn, Cu, or Mg by an amount of less than y.

Aspect 22: The ferrite composition or method of any one or more of the preceding aspects, wherein the Ru is at least partially replaced by at least one of Ti, Sn, or Zr, where the substitution amount is not more than z or is less than z.

Aspect 23: The ferrite composition or method of any one or more of the preceding aspects, wherein the Ru is not at least partially replaced and/or the Co is not at least partially replaced.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A ferrite composition comprising a BiRuCo-M-type ferrite having the formula:

$$Me_{1-x}Bi_xCo_yRu_zFe_{12-t}O_{19}$$

wherein Me is at least one of Sr, Pb, or Ba; x is 0.01 to 0.5; y is 0.1 to 2; z is 0 to 4, and t is 0 to 4;

wherein the Co is optionally at least partially replaced by at least one of Zn, Cu, or Mg by an amount of less than y, wherein the Ru is optionally at least partially replaced by at least one of Ti, Sn, or Zr, where the substitution amount is not more than z.

2. The ferrite composition of claim 1, wherein y is 1 to 2.
3. The ferrite composition of claim 1, wherein Me is at least Ba.
4. The ferrite composition of claim 1, wherein x is 0.01 to 0.5.
5. The ferrite composition of claim 1, wherein the ferrite composition has at least one of a permeability of greater than or equal to 2.5 at a frequency of 1 to 2 gigahertz in the form of a solid ceramic; a permittivity of 8 to 12 at a frequency of 1 to 2 gigahertz in the form of a solid ceramic; a magnetic loss tangent tan N of less than or equal to 0.2 at a frequency of 1 to 2 gigahertz in the form of a solid ceramic; or wherein the ferrite composition has a dielectric loss tangent tank of less than or equal to 0.02 at a frequency of 1 to 2 gigahertz in the form of a solid ceramic.
6. The ferrite composition of claim 1, wherein the Co is at least partially replaced by at least one of Zn, Cu, or Mg.
7. The ferrite composition of claim 1, wherein the Ru is at least partially replaced by at least one of Ti, Sn, or Zr.
8. A composite comprising the ferrite composition of claim 1 and a polymer.
9. An article comprising the ferrite composition of claim 1.
10. The article of claim 9, wherein the article is an antenna, filter, inductor, circulator, or phase shifter.
11. The article of claim 9, wherein the article is a microwave antenna.
12. The article of claim 9, wherein the article is an antenna operable at a frequency of greater than or equal to 0.1 gigahertz.
13. A ferrite composition comprising a BiRuCo-M-type ferrite having the formula:

$$Ba_{1-x}Bi_xCo_yRu_zFe_{12-t}O_{19}$$

wherein x is 0.01 to 0.5; y is 0.1 to 2; z is 0 to 4, and t is 0 to 4.

14. A method of making the ferrite composition, comprising:

mixing ferrite precursor compounds comprising Me, Fe, Bi, Co, and Ru; and sintering the ferrite precursor compounds in an oxygen atmosphere to form a BiRuCo-M-type ferrite having the formula $$Me_{1-x}Bi_xCo_yRu_zFe_{12-t}O_{19}$$

wherein Me is at least one of Sr, Pb, or Ba; x is 0.01 to 0.5; y is 0.1 to 2; z is 0 to 4, and t is 0 to 4;

wherein the Co is optionally at least partially replaced by at least one of Zn, Cu, or Mg by an amount of less than y, wherein the Ru is optionally at least partially replaced by at least one of Ti, Sn, or Zr, where the substitution amount is not more than z.

15. The method of claim 14, wherein the ferrite precursor compounds comprise $MeCO_3$, $Bi_2O_3$, $Co_3O_4$, $RuO_2$, and $Fe_2O_3$.

16. The method of claim 15, wherein the ferrite precursor compounds comprise 5 to 20 weight percent of $MeCO_3$, 0.01 to 20 weight percent of $Bi_2O_3$, 1 to 15 weight percent of $Co_3O_4$, 0.1 to 10 weight percent of $RuO_2$, and 50 to 80 weight percent of $Fe_2O_3$; all based on the total weight of the precursor compounds.

17. The method of claim 14, wherein the sintering occurs at a sintering temperature of 1,000 to 1,300° C. for a sintering time of 1 to 20 hours.

18. The method of claim 14, further comprising calcining the ferrite precursor compounds in air prior to the sintering.

19. The method of claim 14, further comprising mixing the ferrite precursor compounds with a binder prior to the sintering.

20. The method of claim 14, further comprising forming the ferrite precursor compounds prior to the sintering.

* * * * *